United States Patent
Hall et al.

(10) Patent No.: US 6,736,977 B1
(45) Date of Patent: May 18, 2004

(54) APPARENTLY DRY WASTE MANAGEMENT SYSTEM

(75) Inventors: Jeffrey L. Hall, Rochester, NY (US); Faye Transvalidou, Rochester, NY (US); Lloyd A. Lobo, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 174 days.

(21) Appl. No.: 09/705,542

(22) Filed: Nov. 3, 2000

(51) Int. Cl.$^7$ ................................................. B01D 15/00
(52) U.S. Cl. ....................... 210/666; 210/669; 210/688; 210/729; 210/912; 588/256
(58) Field of Search ................................ 210/666, 669, 210/679, 688, 729, 912; 430/396, 399, 400; 588/255, 256

(56) References Cited

U.S. PATENT DOCUMENTS

| | | | |
|---|---|---|---|
| 5,275,509 A | 1/1994 | Honeycutt | 405/129 |
| 5,288,728 A | 2/1994 | Spears et al. | 210/729 |
| 5,429,629 A | 7/1995 | Latimer et al. | 604/378 |
| 5,437,792 A | 8/1995 | Szembrot et al. | 210/727 |
| 5,457,273 A | 10/1995 | Glover et al. | 588/252 |
| 5,476,593 A | 12/1995 | Christ et al. | 210/729 |
| 5,496,474 A | 3/1996 | Christ, Jr. et al. | 210/725 |
| 5,549,820 A | * 8/1996 | Bober et al. | 210/199 |
| 5,563,267 A | 10/1996 | Christ, Jr. et al. | 544/219 |
| 5,759,410 A | 6/1998 | Christ, Jr. et al. | 210/711 |
| 5,961,939 A | 10/1999 | Kulp et al. | 423/43 |

OTHER PUBLICATIONS

Research Disclosure No. 36544, Sep. 1994, Sections XV to XX.
Research Disclosure No. 37038, Feb. 1995.
"Modern Superabsorbent Polymer Technology", Eds. F. L. Buchholz and A. T. Graham, Wiley–VCH, 1998, Chapters 1, 2 and 7.
D. Dhara, C. K. Nisha, P. R. Chatterji, *J. Macromolecular Science, Part A—Pure and Applied Chem*, 36, 1999, pp. 197–210.
"The Theory of the Photographic Process", 4th Ed., Ed. T. H. James, pp. 77–87, 1977.

* cited by examiner

*Primary Examiner*—Ivars C. Cintins
(74) *Attorney, Agent, or Firm*—Sarah Meeks Roberts

(57) ABSTRACT

A method of disposing of photographic silver halide processing solutions including developer, bleach and at least one silver bearing solution comprising a) combining the developer and bleach solutions to oxidize the developing agent in the developer and form a developer/bleach waste solution, b) treating the silver bearing solution(s) to reduce the silver ion level and form a low silver waste solution; and c) contacting the developer/bleach waste solution and the low silver waste solution with an absorbent material to form an apparently dry waste material having a leachable silver ion level below 5 ppm.

28 Claims, No Drawings

APPARENTLY DRY WASTE MANAGEMENT SYSTEM

FIELD OF THE INVENTION

This invention relates to the disposal of processing solutions used to process silver halide photographic materials.

BACKGROUND OF THE INVENTION

Color photographic processing typically includes the processing steps of development, bleaching, fixing, washing and stabilizing. For color negative materials these steps are practiced using a color developer that generates the dye image and, as a side product, metallic silver; a bleach containing a heavy metal bleaching agent that converts any metallic silver into silver ion; and a fixing solution containing a fixing agent that forms soluble silver ion complexes which are subsequently removed in the washing steps. Finally, the photographic element may be treated to a stabilization step that renders the material stable for storage and includes agents, such as surfactants, that allow water to sheet off the surface without streaking.

The overflow from such a photographic process may consist of environmentally regulated substances such as the reduced form of the color developing agent and its oxidized derivatives, heavy metal ions including silver ion, sequestering agents, and substances that have high oxygen demand. Environmental regulations in some locations restrict the discharge of the reduced form of color developer and solutions which contain any leachable silver greater than 5 ppm. Thus it is typical that this waste is collected in receiver tanks using either one receiver for each solution or one receiver for all solutions. A qualified hauler then picks up the liquid waste for disposal. If the pH of the waste solutions exceeds 12.5 or is less than 2, other environmental regulations may apply.

One alternative to such a "haul away" process by a qualified hauler is to convert the waste by chemical or physical means into a residual solid that can be removed to a place of safe and legal disposal. U.S. Pat. No. 5,457,272 describes a method that solidifies photographic effluent by adding a water-soluble silicate to the effluent in an amount that renders the mixture glass-like and less permeable to water. Unfortunately this reaction occurs over days, which increases the expense to the user because it requires an on-site treatment and storage area. In addition, the effluent cannot contain ammonium ions, since the effluent might release free ammonia when the alkaline earth compound, such as calcium hydroxide, is added. This restriction limits the manufacturer's formulation options.

U.S. Pat. No. 5,275,509 describes a method of disposing of photographic fixer and developer using an absorbing polymer which is substantially insoluble in the mixture of equal parts fixer and developer. The expectation is that the silver ion in this mixture is immobilized and precipitates as insoluble silver sulfide. The mixture can then be disposed of in a landfill or similar site designed to receive nontoxic waste. This practice, however, when applied to the combined color photographic processing effluent, would not address the issue of the reduced color developing agent. In addition, it has been discovered by the inventors herein that the silver ion is not immobilized by the absorbing polymer but can leach from the absorbent, making the resultant mixture subject to environmental regulation.

One method to reduce the silver ion concentration below 5 ppm is to precipitate it from the solution. A particularly efficient precipitating agent is trimercato-s-triazine (TMT) as described in patents U.S. Pat. Nos. 5,288,278; 5,437,792; 5,476,593; 5,496,474; 5,563,267; 5,759,410; and 5,961,939 and references sited therein. These patents describe how to reduce the silver ion concentration below 5 ppm in effluent mixtures that are then discharged to the drain. No consideration is given to managing the reduced form of the color developing agent or the conversion of the liquid waste to apparently dry waste. Other methods of isolation convert the silver ion to silver metal such as electrolytic reduction or use of galvanic cells such as used in the steel wool containing chemical recovery cartridges.

There is still needed a means of waste disposal of combined waste photoprocessing solutions which is simple, less expensive and which is not subject to environmental regulation.

SUMMARY OF THE INVENTION

This invention provides a method of disposing of photographic silver halide processing solutions including developer solution, bleach solution and at least one silver bearing solution comprising a) combining the developer and bleach solutions to oxidize the developing agent in the developer and form a developer/bleach waste solution, b) treating the silver bearing solution(s) to reduce the silver ion level and form a low silver waste solution; and c) contacting the developer/bleach waste solution and the low silver waste solution with an absorbent material to form an apparently dry waste material having a leachable silver ion level below 5 ppm.

The present invention provides a process to use the natural chemistry of the color photographic solution reactions to lower their hazard rating and to add absorbent material to convert the aqueous waste to apparently dry waste. Combining the bleach and developer waste solutions results in the complete oxidation of the reduced developer. Contacting this combined solution with an absorbing material converts the solution to an apparently dry waste that can be discharged to a common waste receptacle. A general hauler can now dispose of this apparently dry, nontoxic waste. This invention also provides the means to reduce the level of leachable silver ion from silver bearing waste solutions to below 5 ppm. The liquid mixture can then be rendered apparently dry and shipped to a refiner to extract the silver. Alternatively, the silver ion can be separately removed from the effluent stream to a level below 5 ppm and the residual liquid rendered apparently dry for easy waste disposal to a landfill or similar site designed to receive nontoxic waste.

DETAILED DESCRIPTION OF THE INVENTION

The first step in the method of the invention is to combine the overflow or waste developer and bleach solutions to oxidize the developing agents in the developer and form a developer/bleach waste solution. The function of the developer in the photochemical process is to reduce the silver halide in the silver halide photographic material to silver metal. In so doing, the developing agent is oxidized. With color photographic materials, the useful image consists of one or more organic dye images produced by color couplers which react with the oxidized color developing agent formed wherever silver halide is reduced to metallic silver. After the completion of the color developing step the unused color developing agent is in a reduced state.

The function of the bleach bath in the photochemical process is to convert metallic silver formed in the developer to an ionic state. The bleach reaction requires that the silver be oxidized by an oxidizing agent. The overflow or waste bleach solution contains a certain amount of unreacted oxidizing agent. By combining the waste bleach and developer solutions the reduced developer is oxidized to an environmentally benign developer/bleach waste solution. Additionally the pH of the waste developer is often quite high, generally about 9 to 12. Combining it with the bleach solution which generally has a pH of 2 to 6.5 neutralizes the alkaline developer. Combining the bleach and developer may be done in any manner known to those skilled in the art such as by mixing, agitation, spraying or any other means. It may be done at a separate waste processing station with the developer/bleach waste solution then being transported to a waste processing station containing the absorbent or it could be done, for example, by combining the solutions at a processing station and then adding the absorbent at the same station. The waste processing station may be any area wherein a waste solution is processed. The various stations may be part of the same apparatus or piece of equipment or they may be in separate pieces of equipment. They may also be part of the photoprocessing equipment. They may also be in the same or different geographic locations. Nonlimiting examples of waste processing stations include a tank, chamber, channel, or drum.

To render photographic processing effluent non-toxic requires the complete oxidation of the color-developing agent in the waste effluent. As an example, in one embodiment of the invention this can occur according to the following reaction:

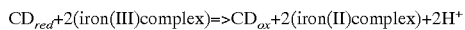

$$CD_{red} + 2(\text{iron(III)complex}) => CD_{ox} + 2(\text{iron(II)complex}) + 2H^+$$

The molar concentrations of the developer in the fresh process solution is often significantly lower than the molar concentrations of the beaching agent in the bleach solution. For example in typical solutions the color developer concentration is 0.077 moles/liter while the iron(III) concentration in the bleach is 0.466 moles per liter. If equal parts of these solutions are mixed together it is expected that the color developing, agent would be completely oxidized. However, during processing these solutions are not used at the same relative rates. The reactions in the developer control the image formation and are therefore sensitive to waste products of the development process. The bleaching solution is often more concentrated and less critical to the imaging process therefore this solution is often used at a lower rate than the developer solution. Ratios vary from as high as 3:1 developer to bleach down to 1:1. At a 3:1 ratio, the formulation of the fresh solutions are just sufficient to stoichiometrically convert the reduced form of the developer (0.23 moles in the above example) to the oxidized form (requires 0.46 moles of iron(III) complex). Therefore, in order to be assured that there is sufficient bleaching agent in its oxidized form to convert the reduced developing agent to its oxidized form requires that the color developer solution and the bleach solution be mixed together before combining with the other process waste streams coming from the fixer and rinse steps. In particular, mixtures of the fixer solution react with the bleaching agent to convert it to iron(II) thereby lowering the available iron(III) to effect complete oxidation of the color developing agent. Incomplete oxidation of the color developer results in a toxic solution.

The developer/bleach waste solution is then contacted with at absorbent material to form an apparently dry waste material. Useful absorbent materials are described in detail below.

The silver-bearing waste solutions, which include but are not limited to fixers, washes and rinses, are treated to reduce the silver ion level and form a low silver waste solution. Preferably the silver ion is reduced to below 5 ppm. It is the amount of silver ion which determines if the waste solution is low silver. The low silver waste solution may contain insoluble silver. The low silver waste solution is then contacted with an absorbent material to form an apparently dry waste material. The apparently dry waste material must have a leachable silver ion concentration below 5 ppm as defined by Method 1311 (—TCLP—Toxicity Characteristic Leaching Procedure), said method incorporated herein by reference. The treatment to reduce the silver ion level and contacting the low silver waste solution may done virtually simultaneously and this invention is intended to include that possibility. For example, in one embodiment the silver bearing solutions are treated to reduce silver ion content by contacting the solutions with a precipitating agent which will precipitate insoluble silver salts. In one variation of that embodiment the absorbent material and the precipitating agent are contained in the same vessel or container so that the silver hearing solutions will come in contact with the precipitating agent almost simultaneously with coming into contact with the absorbent material.

In another variation of the embodiment wherein the silver bearing solutions are treated with a precipitating agent, the solutions are treated prior to being placed in contact with the absorbent. This may be done at a separate waste processing station or it could be done, for example, by treating the solutions with the precipitating agent at a processing station and then adding the absorbent at the same station. In one preferred embodiment the treated silver bearing solution is separated into a low silver waste solution and insoluble silver prior to the solution coining into contact with the absorbent. The isolated silver can be then be sent to the refiner. The absorbed mother liquor from this separation is now apparently dry and can be sent to an appropriate landfill using a general hauler.

The silver bearing solutions may also be treated to reduce silver ion content by converting the silver ion into silver metal. Examples of methods used to convert the silver ion into silver metal include electrolytic reduction which converts silver ion into silver metal using an electric current or the use of a galvanic cell which converts silver ion to silver with iron or aluminum in a chemical recovery cartridge. The treatment to reduce silver ion may also include a combination of treatment with a precipitating agent and treatment to convert silver ion to silver metal.

The silver bearing solutions may be treated separately to reduce silver ion level or they may be combined before being treated to reduce silver ion level. Preferably they are combined. The developer/bleach waste solution and tile low silver waste solution may be treated as two separate waste streams wherein the developer/bleach waste solution is contacted with a first absorbent material and the low silver waste solution is contacted with a second absorbent material resulting in two separate apparently dry waste materials. Alternatively, the developer/bleach waste solution and the low silver waste solution may be treated as one waste stream wherein the developer/bleach waste solution and the low silver waste solution are contacted with the same absorbent material resulting in one apparently dry waste material.

Precipitating agents effective in reducing the silver ion concentration below 5 ppm in photographic waste are known to those skilled in the art. Nonlimiting examples include metal sulfide salts or metal hydrogensulfide salts; a wide variety of alkyl, aryl, and heterocyclic thiol compounds, including mercaptoazoles such as 5-mercaptotetrazoles, mercaptoazines such as mercaptopyridines, mercaptopyrazines, mercaptopyridazines, mercaptopyrimidines; N-substituted dithiocarbamate salts; O-substituted xanthate salts; and tetraazaindenes; purines. One particularly useful class of precipitating agenets are derived from mercapto-s-triazine or water-soluble salts thereof. The mercapto-s-triazine compound has the formula

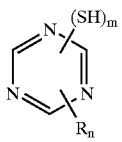

Formula I wherein:

R is hydrogen, —$NH_4$, —OH, an alkyl having 1 to 8 carbon atoms, an alkoxy having 1–8 carbon atoms, phenyl, cyclohexyl, oxazinyl, phenoxy, —$NR'_2$ or —SR". R' is hydrogen, an alkyl having 1 to 8 carbon atoms, phenyl, cyclohexyl, naphthyl or benzyl. R" is an alkyl having 1 to 8 carbon atoms, phenyl, cyclohexyl, naphthyl or benzyl, m is an integer from 1 to 3 and n is 0 or all integer from 1 to 2. A preferred embodiment is trimercapto-s-triazine (TMT) which is sold by Degussa under the tradename "TMT-15".

In the following discussion a "gel" is a gelatinous colloidal material and "gelatin" is protein derived from a collagen source. Absorbent materials which may be useful in the invention can include inorganic materials such as silica gels or organic materials as described below.

Absorbent materials which are preferred for use in this invention are those wherein the absorbent material absorbs at least 20 mls/gm of distilled water using EPA Test Method 9095A, the Paint Filter Liquids Test, said Method incorporated herein by reference and referred to herein as "the Paint Filter test". More preferred are those absorbent materials which absorb at least 50 mls/gm of distilled water using the Paint Filter test. Most preferred are those absorbent materials which absorb at least 100 mls/gm of distilled water using the Paint Filter test.

One class of particularly useful materials with high absorbing capacity is that of superabsorbent polymers. Most of the superabsorbent gels used today are found in baby and feminine hygiene products, agricultural and horticultural applications, cabling, construction materials, food packaging, radioactive waste, and medical waste management. Superabsorbent polymers are crosslinked networks of flexible polymer chains manufactured usually in the form of granules, beads, or powders.

Based on the nature of the groups attached to the polymer backbone, absorbing polymers can be classified into two main groups ionic and non-ionic. The swelling capability of non-ionic polymers in water is a result of diffusion and solvation of the hydrophilic groups of the polymer, the same mechanism that is responsible for dissolution of water-soluble polymers. The difference is that the crosslinks allow the polymer to keep its shape after absorbing water. In contrast, the driving force for ionic polymers is the solvation of ionic groups (e.g. negatively charged sulfonate or carboxylate groups). These groups are more strongly solvated than non-ionic groups and repel adjacent groups of similar charge in the polymer chain. The requirement for charge neutrality and the associated free counterions and the strong solvation create a strong osmotic force and high swelling capacity for these gels.

Commercially available superabsorbents are lightly crosslinked homopolymers or copolymers of partially neutralized acrylic acid, its derivatives (e.g. acrylamide), or other polymers (e.g. polyalcohols). These materials are usually produced by suspension or bulk polymerization. In order to achieve superabsorbent properties, acrylic acid can be co-polymerized with another monomer containing multiple vinyl groups, so that crosslinks are formed during the polymerization reaction, or polymer chains can be subsequently crosslinked with reaction to a di-functional molecule. Depending on the method, small amounts of crosslinkers or reaction initiators may be added to the reacting mixture and small amounts of monomer and non-crosslinked chains may remain in the final product. Even at ppm level, additives or impurities can have a great effect on the properties of the gel produced. There are infinite possibilities for engineering the properties of such polymers, so they address the needs of a particular application. For a description of superabsorbent materials, their chemistry and manufacturing methods see *Modern Superabsorbent Polymer Technology*, edited by F. L. Buchholz and A. T. Graham, WILEY-VCH, 1998.

Although superabsorbent gels may absorb over 100 mls of water per gram of gel, their swell performance depends on the molecular structure of the polymer, the degree of crosslinking, the morphology and size of the gel particles and the ionic strength and pH of the solution to be absorbed (D. Dhara, C. K. Nisha, P. R. Chatterji, *J. Macromolecular Science, Part A—Pure and Applied Chem,* 36, 1999, pp197 to 210. Certain products (e.g. hygiene products as described in U.S. Pat. No. 5,429,629) employ combinations of the above materials (i.e. microfiber matrices with interspersed superabsorbent gel particles) to maximize absorbing capacity and ensure uniform wetting.

For photographic processing waste management, three properties of such gels are important; 1) equilibrium absorption capacity (mls of solution absorbed per gram of gel), and good performance on the Paint Filter test (EPA Test Method 9095A), 2) absorption rate (mls of solution absorbed/gram of gel vs. time); and 3) adequate thermal stability of the swollen absorbent. An absorbent material containing photoprocessing effluent can be discarded in a municipal solid waste landfill, that is the regular trash, if it does not contain free liquids. For purposes of this invention a material is determined to contain free liquids as defined by the EPA Test Method 9095A, the Paint Filter Liquids Test. Apparently dry waste materials are those materials that pass this published test method.

Ideally, gels used for solidifying solution waste should be very fast, efficient and homogeneous absorbers to minimize materials and facilitate packaging and transportation. The absorption rate is critical for systems where large amounts of solutions may be disposed at once (seasoned processors) and are less critical for single-use processors that process and discard small volumes of solution at a time. In addition, since it is required to transport the spent absorbent material (swollen with photographic processing effluent) from the point of waste generation to the point of disposal, the spent absorbent should be stable at the temperatures to which it is subjected to during transportation.

A class of absorbents that is environmentally friendly is made from biodegradable materials. Usual synthetic polymers such as vinyl, urethanes, esters, phenolic resins are not susceptible to bacterial degradation. The two most common polymers that are biodegradable are polysaccharides (degraded to glucose) and proteins (degraded to amino acids) and they are also naturally occurring. The requirement for these materials to be considered absorbents is that they do not "dissolve" in the solutions that they are trying to absorb. In order to render them insoluble, it is necessary that they be crosslinked to some degree. These crosslinks can be achieved by using a chemical cross linker such as chromealum (that reacts with carboxylic acid sites) or aldehydes (that react with the amine sites in the proteins). It is also possible to crosslink via physical interactions. For example polysaccharide gels from carrageenan, alginates and agar have been well documented and used in the food industry. Similarly protein gels such as from gelatin are also well known.

Although, it is possible to use gels from polysaccharides as absorbents they suffer from two disadvantages. First the gelation of the material is very sensitive to the presence of salts, which can be particularly problematic for absorbing photographic processing effluents. Secondly the absorption capacity of these gels is limited, due to the low amount of ionic species present in these molecules. Gels from gelatin, on the other hand, are thermoreversible and not very susceptible to the presence of ions. Secondly, the presence of high concentration of carboxylic acid groups and amine groups, allows gelatin gels to be crosslinked by chemical means.

The absorption efficiency of gelatin gels are based on two factors 1) the osmotic component of the gel, which is directly proportional to the number of polymer segments that are soluble in water plus the amount of associated counterions, necessary to maintain electroneutrality, due to the charges on the gelatin; and 2) the amount of physical or chemical crosslinks that inhibit the gel from expanding. The only means to manipulate the osmotic component of gelatin is via the amino acid species that are ionizable, specifically those that contain free carboxylic acid (aspartic acid and glutamic acid) and free amines (lysine, hydroxylysine and aspartine). Since, both these species are titratable in the pH ranges of interest, there exists a pH, called the isoelectric point (IEP), at which the number of ionized acid sites equals the number of protonated amine sites, such that the net charge on the gelatin molecule is zero. The charge on the molecule increases as the pH is changed away from the isoelectric point. Thus, it is desirable to choose gelatin materials whose isoelectric point is furthest from the pH of the solution to be absorbed. The isoelectric point of the gelatin depends on the source of the collagen, from which it is made, as well as the conditions of hydrolysis. Gelatins from hides are typically at a higher IEP than from bone. Hydrolysis under acid conditions yield gelatins with a higher IEP than under alkaline conditions. The IEP of some commercial gelatins are listed in the table below:

| Collagen Source | Hydrolysis | IEP |
|---|---|---|
| Pig skin | Acid | 9.0 |
| Bovine Ossein | Acid | 7–8 |
| Bovine Ossein | Alkaline | 5.0 |

The modulus of a gelatin gel, is a measure of the amount of physical crosslinks. The modulus is commonly called the bloom strength or gel strength and is one of the properties attributed to the gelatin by the supplier. One method of measuring the gel strength is by chilling a 6.16% gelatin solution to 10 C. for 24 hours and then measuring the weight in grams required to depress a cylindrical plunger 0.5"in diameter, with a $1/64^{th}$ radius of curvature at the bottom, by 4 mm. The bloom strength is mainly affected by molecular weight of the gelatin and the method of hydrolysis. Harsh hydrolysis and high molecular weight degrade the bloom strength. In order to obtain high absorption efficiency and still maintain integrity of the gelatin an optimum bloom strength is desirable. Thus it is preferred that the gelatin used to prepare an absorbent have a bloom strength between 100 gms and 300 gms.

Since gelatin gels are thermoreversible, the physical crosslinks are usually not enough. This is particularly true when the fully swollen gelatins experience temperatures above 25 C. The melting temperature of a swollen gelatin gel depends on the mean molecular weight of the gelatin and on the amount of water absorbed. It also is affected, to a smaller extent, on the amount and type of the ionic species present in the liquid to be absorbed. One measure of MW is to measure the viscosity of a 6.16% gelatin solution (moisture corrected) adjusted to a pH of 5.75 using Brookfield DV-II viscometer with SC4-18 spindle at 79.4 s$^{-1}$ (60 rpm) at 40□ C. This viscosity is termed the nominal viscosity of the gelatin and is directly proportional to the mean molecular weight of the gelatin. In order to have a gelatin gel with a high melting point it is desired to have a gelatin whose nominal viscosity is greater than 3 cp. It is especially preferred that the nominal viscosity is greater than 10 cp.

Thus, it is highly desirable to have additional crosslinks achieved via chemical means and which are not thermoreversible. There are several classes of chemical crosslinkers that can be used for gelatin. These are described in "The Theory of the Photographic Process" $4^{th}$ Ed., Ed. T. H. James, pg. 77–87, 1977. The class of inorganic hardeners are salts of chromium and some salts of aluminum. These typically crosslink via the free carboxylic acids in gelatin and the degree of crosslinking is pH sensitive and also reversible. It is not desirable to use these materials for absorbents because of the impact these materials have on the environment. The organic hardeners act via the $\epsilon$-amino function of lysine and hydroxylysine. There are on the average of 0.35–0.4 mmol of lysine and about 20% of that amount of hydroxylysine per gram of dry gelatin. Classes of organic hardeners include, but are not limited to, aldehydes and blocked aldehydes, ketones, carboxylic and carbamic acid derivatives, sulfonate esters and sulfonyl halides, s-triazines, epoxides, aziridines, isocyanates, carbodiimides and isoxazolitim salts. Polymeric hardeners are generic polymer molecules bearing one or more of the above moieties in their chain. The selection of the hardener type depends on the efficacy of the crosslinking, its toxicity in the native state and the residuals in the absorbent, and cost. The amount of hardener type is a function of the optimization of the absorbents absorption efficiency and thermal stability, as demonstrated in the examples below. For purposes of this invention we define the effective mole of crosslinker as the (number of molecules divided by the Avagadro Number) of the species that can react with two $\epsilon$-amine sites in gelatin. Thus, for a simple hardener like formaldehyde the effective moles is equal to the actual moles, whereas for a polymeric hardener the effective moles is calculated based on the total moles of the monomers that act as crosslinkers. In order to optimize the gelatin absorbent to have a high absorption efficiency and high melting temperature the amount of effective moles of crosslinker should be between 2 and 200 $\mu$mole/gm of gelatin.

In order to increase the osmotic component of the gelatin, several other ionic species can be utilized. Ionic polymers, or polyelectrolytes, are preferred because they will not migrate out of the gel. Ionic species are preferred because the osmotic factor is enhanced by the presence of free counterions (in effect more than doubling the osmotic enhancement compared to nonionic species). However, their efficacy is reduced if the absorbing solution also has a high ionic strength. Nevertheless, these polyelectrolytes do provide increased osmotic factor, even for high ionic strength photographic processing effluents, as evidenced in the examples below. The charge on the polyelectrolyte should be opposite to the effective charge on the gelatin molecule and since the IEP of gelatin is usually below 7.0, anionic polyelectrolytes are preferred over cationic ones. Tile anions that are part of the polyelectrolyte may include $COO^-$, $SO_3^-$, $SO_4^-$, and $PO_4^-$. Examples of ionic monomers that comprise these polyelectrolytes are disclosed (but not limited to) in U.S. Pat. Nos. 5,589,322 and 5,977,190. In order to have high compatibility of the polyelectrolytes with gelatin, it is preferred to have polyelectrolytes which have some or all of the anions as $COO^-$, which is common to the anion present on the gelatin molecule. The anionic polyelectrolyte can also be comprised of some amount of nonionic monomer. However, if the amount of anionic monomer is too low, then the absorption efficiency will drop. Thus, it is desired that at least 25% of the monomers be anionic and preferably that these contain a carboxylic acid group. A preferred anionic polyelectrolyte is a polyacrylic acid; particularly useful is sodium poly(acrylamido-2-methyl propane sulfonate).

One of the drawbacks of using polyelectrolytes is that they weaken the gel because they do not participate in physical or chemical crosslinking. One way of overcoming this is to prepare polyelectrolytes that behave like gelatin, except that they have a higher ionic content. These polymers would be ones which have an anionic monomer as well as a cationic monomer that has the same functionality for crosslinking as gelatin. A certain amount of nonionic monomer can also be included to improve the compatibility with gelatin. In order to crosslink effectively, the polyelectrolyte polymer should contain at least 10 mole % of the monomer with the crosslinkable functionality. Examples of such crosslinkable monomers are those that have a quaternary ammonium ion. The amount of polyelectrolyte (not including gelatin) can be up to 50% by weight of the absorbent. The preferred amounts of polyelectrolyte is from 10 to 30% by weight of the absorbent.

The compromise between high osmotic factor and degree of crosslinking depends on the functionality of the absorbent. There is a general relationship that as the efficiency of the absorbent, as defined by milliliters of fluid absorbed per gram of dry absorbent, increases, the melting temperature of the fully swollen absorbent decreases. Although this is a general relationship there are specific combinations of materials that are more favorable than others, as defined by the functionality of the absorbent. As will be shown in the examples below, these novel combinations provide a better thermal stability, for a given degree of absorption efficiency. For purposes of this invention, absorbent effectiveness is defined as the product of the absorbent efficiency (mls of solution absorbed/gm of absorbent) and the melting temperature of the absorbent fully saturated with the respective solution to be absorbed.

Certain absorbents are commercially available absorbents in the form of mats, pads, rolls are usually made of polypropylene or mixtures of polypropylene, polyester microfibers or other similar polymers that can be spun into fibers and woven into a textile form. These materials are mainly used for chemical and petroleum products spill containment. They are lightweight, incinerable, and easier to handle than granular sorbents. Capillary action is the driving force that draws liquids into the fibrous matrix. Manufacturers (e.g. 3M) claim high absorbing capacities for these materials, which have found widespread uses in machine shops, chemical laboratories, petroleum industry, and trucking industry. It has been found such absorbents are not particularly useful when used alone with this invention; however, such absorbents may be useful in combination with the superabsorbents and gelatin gels described above.

Examples that demonstrate this invention use color negative process solutions but are not meant to limit this application to color negative film processing solutions Other photographic materials and processing systems are described in:

Research Disclosure, September 1994, Item 36544, Sections XV to XX which describes supports, exposure, development systems and processing methods and agents and in Research Disclosure, February 1995, Item 37038 which describes certain desirable photographic elements and processing steps, particularly those useful in conjunction with color reflective prints.

Photographic color developing compositions, the waste solutions of which may be disposed of pursuant to this invention, typically include one or more color developing agents and various other conventional addenda including preservatives or antioxidants (including sulfites, and hydroxylamine and its derivatives), sulfites, metal ion sequestering agents, corrosion inhibitors and buffers. These materials can be present in conventional amounts. For example, the color developing agent is generally present in an amount of at least 0.001 mol/l (preferably at least 0.01 mol/l), and an antioxidant or preservative for the color developing agent is generally present in an amount of at least 0.0001 mol/l (preferably at least 0.001 mol/1). The pH of the composition is generally from about 9 to about 13, and preferably from about 11.5 to about 12.5.

Exemplary color developing compositions and components (except the sensitizing dye stain reducing agents described herein) are described for example, in EP-A-0 530 921 (Buongiorne et al), U.S. Pat. No. 5,037,725 (Cullinan et al), U.S. Pat. No. 5,552,264 (Cullinan et al), U.S. Pat. No. 5,508,155 (Marrese et al), U.S. Pat. No. 4,892,804 (Vincent et al), U.S. Pat. No. 4,482,626 (Twist et al), U.S. Pat. No. 4,414.307 (Kapecki et al), in U.S. Pat. No. 4,876,174 (Ishikawa et al), U.S. Pat. No. 5,354,646 (Kobayashi et al) and U.S. Pat. No. 4,264,716 (Vincent et al), all incorporated herein for their teaching about color developing compositions.

Useful preservatives in the color developing compositions include sulfites (such as sodium sulfite, potassium sulfite, sodium bisulfite and potassium metabisulfite), hydroxylamine and its derivatives, especially those derivatives having substituted or unsubstituted alkyl or aryl groups, hydrazines, hydrazides, amino acids, ascorbic acid (and derivatives thereof), hydroxamic acids, aminoketones, mono- and polysaccharides, mono- and polyamines, quaternary ammonium salts, nitroxy radicals, alcohols, and oximes. More particularly useful hydroxylamine derivatives include substituted and unsubstituted monoalkyl- and dialkylhydroxylamines (especially those substituted with sulfo, carboxy, phospho, hydroxy, carbonamido, sulfonamido or other Solubilizing groups). Mixtures of compounds from the same or different classes of antioxidants can also be used if desired.

Examples of useful antioxidants are described for example, in U.S. Pat. No. 4,892,804 (noted above), U.S. Pat. No. 4,876,174 (noted above), U.S. Pat. No. 5,354,646 (noted above), U.S. Pat. No. 5,660,974 (Marrese et al), and U.S. Pat. No. 5,646,327 (Bums et al), the disclosures of which are all incorporated herein by reference for description of useful antioxidants. Many of these antioxidants are mono- and dialkylhydroxylamines having one or more substituents on one or both alkyl groups. Particularly useful alkyl substituents include sulfo, carboxy, amino, sulfonamido, carbonamido, hydroxy and other solubilizing substituents.

Most preferably, the noted hydroxylamine derivatives can be mono- or dialkylhydroxylamines having one or more hydroxy substituents on the one or more alkyl groups. Representative compounds of this type are described for example in U.S. Pat. No. 5,709,982 (Marrese et al), incorporated herein by reference. Specific di-substituted hydroxylamine antioxidants include, but are not limited to: N,N-bis (2,3-dihydroxypropyl)hydroxylamine, N,N-bis(2-methyl-2,3-dihydroxypropyl)hydroxylamine and N,N-bis(1-hydroxymethyl-2-hydroxy-3-phenylpropyl)hydroxylamine. The first compound is preferred.

Particularly useful color developing agents include aminophenols, p-phenylenediamines (especially N,N-dialkyl-p-phenylenediamines) and others which are well known in the art, such as EP 0 434 097A1 (published Jun. 26, 1991) and EP 0 530 921A1 (published Mar. 10, 1993). Preferred color developing agents include, but are not limited to, N,N-diethyl p-phenylenediamine sulfate (KODAK Color Developing Agent CD-2), 4-amino-3-methyl-N-(2-methane sulfonamidoethyl)aniline sulfate, 4-(N-etyl-N-β-hydroxyethylamino)-2-methylaniline sulfate (KODAK Color Developing Agent CD-4), p-hydroxyethylethylaminoaniline sulfate, 4-(N-ethyl-N-2-methanesulfonylaminoethyl)-2-methylphenylenediamine sesquisulfate (KODAK Color Developing Agent CD-3), 4-(N-ethyl-N-2-methanesulfonylaminoethyl)-2-methylphenylenediamine sesquisulfate, and others readily apparent to one skilled in the art.

Photographic bleaching compositions, the waste solutions of which may be disposed of pursuant to this invention, generally include one or more persulfate, peracid (such as hydrogen peroxide, periodates or percarbonates) or high metal valent ion bleaching agents, such as iron(II) complexes with simple anions (such as nitrate, sulfate, and acetate), or with carboxylic acid or phosphonic acid ligands. Particularly useful bleaching agents include iron complexes of one or more aminocarboxylic acids, aminopolycarboxylic acids, polyaminocarboxylic acids or polyaminopolycarboxylic acids, or salts thereof. Particularly useful chelating ligands include conventional polyaminopolycarboxylic acids including ethylenediaminetetraacetic acid, and others described in *Research Disclosure*, noted above, U.S. Pat. No. 5,582,958 (Buchanan et al) and U.S. Pat. No. 5,753,423 (Buongiorne et al). Biodegradable chelating ligands are also desirable because the impact on the environment is reduced. Useful biodegradable chelating ligands include, but are not limited to, iminodiacetic acid or an alkyliminodiacetic acid (such as methyliminodiacetic acid), ethylenediaminedisuccinic acid and similar compounds as described in EP-A-0 532,003, and ethylenediamine monosuccinic acid and similar compounds as described in U.S. Pat. No. 5,691,120 (Wilson et al), all of which are incorporated herein by reference in relation to their description of bleaching agents.

These and many other such complexing ligands known in the art including those described in U.S. Pat. No. 4,839,262 (Schwartz), U.S. Pat. No. 4,921,779 (Cullinan et al), U.S. Pat. No. 5,037,725 (noted above), U.S. Pat. No. 5,061,608 (Foster et al), U.S. Pat. No. 5,334,491 (Foster et al), U.S. Pat. No. 5,523,195 (Darmon et al), U.S. Pat. No. 5,582,958 (Buchanan et al), U.S. Pat. No. 5,552,264 (noted above), U.S. Pat. No. 5,652,087 (Craver et al), U.S. Pat. No. 5,928,844 (Feeney et al) U.S. Pat. No. 5,652,085 (Wilson et al), U.S. Pat. No. 5,693,456 (Foster et al), U.S. Pat. No. 5,834,170 (Craver et al), and U.S. Pat. No. 5,585,226 (Strickland et al), all incorporated herein by reference for their teaching of bleaching compositions. The total amount of bleaching agent(s) in the composition is generally at least 0.0001 mol/l, and preferably at least 0.05 mol/l. These amounts would apply to bleach-fixing compositions also.

Other components of the bleaching solution include buffers, halides, corrosion inhibiting agents, and metal ion sequestering agents. These and other components and conventional amounts are described in the references in the preceding paragraph. The pH of the bleaching composition is generally from about 4 to about 6.5.

Particularly useful bleaching agents are ferric ion complexes of one or more of ethylenediaminetetraacetic acid (EDTA), ethylenediaminedisuccinic acid (EDDS, particularly the S,S-isomer), methyliminodiacetic acid (MIDA) or other iminodiacetic acids, beta-alaninediacetic acid (ADA), ethylenediaminemonosuccinic acid (EDMS), 1,3-propylenediaminetetraacetic acid (PDTA), nitrilotriacetic acid (NTA), and 2,6-pyridinedicarboxylic acid (PDCA). The most preferred bleaching agent is a ferric ion complex of EDTA for processing color reversal materials. For processing, color negative materials and color papers, a ferric complex of PDTA is preferred. Multiple bleaching agents can be present if desired.

Fixing solutions, the silver bearing waste solutions of which may be disposed of pursuant to this invention, contain a photographic fixing agent. Examples of photographic fixing agents include, but are not limited to, thiosulfates (for example sodium thiosulfate, potassium thiosulfate and ammonium thiosulfate), thiocyanates (for example sodium thiocyanate, potassium thiocyanate and ammonium thiocyanate), thioethers (such as ethylenebisthioglycolic acid and 3,6-dithia-1,8-octanediol), imides and thiourea. Thiosulfates and thiocyanates are preferred, and thiosulfates are more preferred. Ammonium thiosulfate is most preferred. The general amount of total fixing agents in the fixing composition of this invention is at least 0.001 mol/l, and preferably at least 0.1 mol/l. These amounts would apply to bleach-fixing compositions also.

It is also known to use fixing accelerators in fixing compositions. Representative fixing accelerators include, but are not limited to, ammonium salts, guanidine, ethylenediamine and other amines, quaternary ammonium salts and other amine salts, thiourea, thioethers, thiols and thiolates. Examples of useful thioether fixing accelerators are described in U.S. Pat. No. 5,633,124 (Schmittou et al), incorporated herein for the teaching of fixing compositions.

Fixing compositions generally contain one or more monovalent or divalent cations supplied by various salts used for various purposes (for example, salts of fixing agents). It is preferred that the cations be predominantly ammonium cations, that is at least 50% of the total cations are ammonium ions. Such fixing compositions are generally known as "high ammonium" fixing compositions.

Fixing compositions can also include one or more of various addenda optionally but commonly used in such compositions for various purposes, including hardening agents, preservatives (such as sulfites or bisulfites), metal sequestering agents (such as polycarboxylic acids and organophosphonic acids), buffers, and fixing accelerators. The amounts of such addenda in the working strength compositions would be readily known to one skilled in the art.

The desired pH of fixing compositions is generally 8 or less, and can be achieved and maintained using any useful combination of acids and bases, as well as various buffers.

Other details of fixing compositions not explicitly described herein are considered well known in the art, and are described for example, in *Research Disclosure* publication 38957 (noted below), and publications noted therein in paragraph XX(B), U.S. Pat. No. 5,424,176 (Schmittou et al), U.S. Pat. No. 10 4,839,262 (noted above), U.S. Pat. No. 4,921,779 (noted above), U.S. Pat. No. 5,037,725 (noted above), U.S. Pat. No. 5,523,195 (noted above), U.S. Pat. No. 5,552,264 (noted above), all incorporated herein by reference for their teaching of fixing compositions.

Another photoprocessing composition which may result in a silver bearing waste solution is a dye stabilizing composition containing one or more photographic imaging dye stabilizing compounds. Such compositions can be used at the end of the processing sequence (such as for color negative films and color papers), or in another part of the processing sequence (such as between color development and bleaching as a pre-bleaching composition).

Such dye stabilizing compositions generally have a pH of from about 5.5 to about 8, and include a dye stabilization compound (such as an alkali metal formaldehyde bisulfite, hexamethylenetetramine, various benzaldehyde compounds, and various other formaldehyde releasing compounds), buffering agents, bleach-accelerating compounds, secondary amines, preservatives, and metal sequestering agents. All of these compounds and useful amounts are well known in the art, including U.S. Pat. No. 4,839,262 (noted above), U.S. Pat. No. 4,921,779 (noted above), U.S. Pat. No. 5,037,725 (noted above), U.S. Pat. No. 5,523,195 (noted above) and U.S. Pat. No. 5,552,264 (noted above), all incorporated herein by reference for their teaching of dye stabilizing compositions. Generally, one or more photographic dye stabilizing compounds are present in an amount of at least 0.0001 mol/l. A preferred dye-stabilizing composition includes sodium formaldehyde bisulfite as a dye stabilizing compound, and thioglycerol as a bleach-accelerating compound. More preferably, this composition is used as a pre-bleaching composition during the processing of color reversal photographic materials.

In some systems a dye stabilizing composition or final rinsing composition is used to clean the processed photographic material as well as to stabilize the color image. Either type of composition generally includes one or more anionic, nonionic, cationic or amphoteric surfactants, and in the case of dye stabilizing compositions, one or more dye stabilizing compounds as described above. Particularly useful dye stabilizing compounds useful in these dye stabilizing compositions are described for example in EP-A-0 530 832 (Konia et al) and U.S. Pat. No. 5,968,716 (McGuckin et al). Other components and their amounts for both dye stabilizing and final rinsing compositions are described in U.S. Pat. No. 5,952,158 (McGuckin et al), U.S. Pat. No. 3,545,970 (Giorgianni et al), U.S. Pat. No. 3,676,136 (Mowrey), U.S. Pat. No. 4,786,583 (Schwartz), U.S. Pat. No. 5,529,890 (McGuckin et al), U.S. Pat. No. 5,578,432 (McGuckin et al), U.S. Pat. No. 5,534,396 (noted above), U.S. Pat. No. 5,645,980 (McGuckin et al), U.S. Pat. No. 5,667,948 (McGuckin et al), U.S. Pat. No. 5,750,322 (McGuckin et al) and U.S. Pat. No. 5,716,765 (McGuckin et al), all of which are incorporated by reference for their teaching of such compositions.

General and preferred concentrations of the compounds in various compositions are described below in TABLE I. The endpoints of all ranges are considered approximate so that they should be interpreted as "about" the noted amounts.

TABLE 1

| COMPOSITION | GENERAL (mol/l) | PREFERRED (mol/l) |
|---|---|---|
| Color Developing | 0.0001–0.1 | 0.001–0.008 |
| Pre-bleaching | 0.0001–0.01 | 0.001–0.005 |
| Bleaching | 0.00005–0.5 | 0.0001–0.5 |
| Fixing | 0.00005–0.001 | 0.0001–0.001 |
| Bleach-fixing | 0.0001–0.001 | 0.001–0.005 |
| Dye Stabilizing | 0.0001–0.01 | 0.001–0.005 |
| Final Rinsing | 0.0001–0.01 | 0.001–0.005 |
| Washing solution | 0.00005–0.001 | 0.0001–0.001 |

Representative sequences for processing various color photographic materials are described for example in *Research Disclosure* publication 308119, December 1989, publication 17643, December 1978, and publication 38957. September 1996.

Silver halide photographic elements which are processed include color negative photographic films, color reversal photographic films, and color photographic papers. The general sequence of steps and conditions (times and temperatures) for processing are well known as Process C-41 and Process ECN-2 for color negative films, Process E-6 and Process K-14 for color reversal films. Process ECP for color prints, and Process RA-4 for color papers.

For example, color negative films that can be processed using the compositions described herein include, but are not limited to, KODAK MAX™ films. KODAK ROYAL GOLD™ films, KODAK GOLD™ films, KODAK PRO GOLD™ films, KODAK FUNTIME™, KODAK EKTAPRESS PLUS™ films, EASTMAN EXR™ films, KODAK ADVANTIX™ films, FUJI SUPER G Plus films, FUJI SMARTFILM™ products, FUJICOLOR NEXIA™ films, KONICA VX films. KONICA SRG3200 film, 3M SCOTCH™ ATG films, and AGFA HDC and XRS films. Films processed can also be those incorporated into what are known as "single-use cameras".

In addition, color papers that can be processed include, but are not limited, KODAK EKTACOLOR EDGE V, VII and VIII Color Papers (Eastman Kodak Company), KODAK ROYAL VII Color Papers (Eastman Kodak Company), KODAK PORTRA III, IIIM Color Papers (Eastman Kodak Company), KODAK SUPRA III and IIIM Color Papers (Eastman Kodak Company), KODAK ULTRA III Color Papers (Eastman Kodak Company), FUJI SUPER Color Papers (Fuji Photo Co., FA5, FA7 and FA9), FUJI CRYSTAL ARCHIVE and Type C Color Papers (Fuji Photo Co.), KONICA COLOR QA Color Papers (Konica, Type QA6E and QA7), and AGFA TYPE II and PRESTIGE Color Papers (AGFA). The compositions and constructions of such commercial color photographic elements would be readily determined by one skilled in the art, KODAK DURATRANS, KODAK DURACLEAR, KODAK EKTAMAX RAL and KODAK DURAFLEX photographic materials. and KODAK Digital Paper Type 2976 are also typically processed as described above.

The following examples are intended to illustrate and not to limit the invention herein.

EXAMPLES

Samples of commercially available absorbents were received from the following suppliers:

JRM Chemical, 15663 Neo Pkwy, Cleveland, Ohio 44128-3150, USA

SIGMA, P.O. Box 355, Milwaukee, Wis. 53201, USA

Chemgon LLC, 1001 South Royer Street, Colorado Springs, Colo. 80903.

Fisher Scientific, 1801 Gateway Blvd., Suite 101, Richardson, Tex. 75080-3750

Specific materials tested were:

Soilmoist, a polyacrylamide from JRM

P-7588, a polyacrylate-polyalcohol from SIGMA with particle size of 100–850 microns beads and Chemgon®, an acrylate-acrylamide copolymer with other additives, that is commercially available as a superabsorbent for management of photographic processing waste from developer and fixer mixtures.

3M high performance chemical sorbent C-PD914DD,

No attempt was made to optimize any of these materials for the specific applications. The materials were tested as supplied for absorption rate and final equilibrium absorption capacity, as well as subjected selected samples to a simulated Paint Filter Test.

Chemical Solutions used in Examples Listed Below

The Color Developer solution used in these tests is as follows (units are per liter):

29.4 grams of 45% solution of $K_2SO_3$ 2.8 grams of dry NaBr 3.0 grams of hydroxylamine sulfate 6.5 grams of 40% solution of Antical-8

85.11 grams of 47% solution of $K_2CO_3$ 15.0 grams of 4-(N-ethyl-N-2-hydroxyethyl)-2-methylphenylenediamine sulfate 3.0grams of polyvinlypyrrolidone pH adjusted to 10.48

The Bleach solution used in these tests is as follows (units are per liter):

159.84 grams of 1,3-propylenediaminetetra acidic acid 70.8 grams of succinic acid 60.0 grams $NH_4Br$ 188.09 grams of $Fe(NO_3)_3$, $9H_2O$ pH adjusted to 4.0

The Fixing solution used in these tests is as follows (units are per liter)

21.5 grams ammonium sulfite 350 mls of 56.5% w/w ammonium thiosulfate with 4.0% ammonium sulfite (sp.gr. 1.3352)

1.08 grams disodium salt of 1,2-ethylenediaminetetra acidic acid 1.0 grams mercaptotriazole (1,2-dihydro-3H-1,2,4-triazole-3-thione)

pH adjusted to 7.9

The Final Rinse solution used in these tests is as follows (units are per liter)

9mls of KODAK FLEXICOLOR Final Rinse

These solutions were used to simulate potential effluent solutions obtained from a color negative film processor. Mixture 1 was a simulated effluent of developer and bleach.

Mixture 1=63.3% v/v of Color Developer mixed with 36.7% v/v Bleach.

Mixture 2 was a simulated effluent of fix and final rinse.

Mixture 2=3.4% v/v Bleach
30.23% v/v Fix
66.27% Final Rinse
0.56 g/L AgI
12.50 g/L AgBr The AgI and AgBr are omitted if the test references effluent of Mixture 2 without silver.

Mixture 3 was a combination of these two effluent mixtures;

Mixture 3=42.12% v/v Mixture 1
57.88% v/v Mixture 2

The AgI and AgBr are omitted if the test references effluent of Mixture 3 without silver.

Mixture 4 was a combination of developer and bleach.

Mixture 4=79% v/v of Color Developer mixed with 21% v/v Bleach.

Mixture 5 was a simulated effluent of developer, bleach, fix and final rinse.

Mixture 5=0.50% v/v Developer
1.7% v/v Bleach
54.50% v/v Fix
43.3% Final Rinse
0.35 g/L AgI
8.18 g/L AgBr The AgI and AgBr are omitted if the test references effluent of Mixture 5 without silver.

Mixture 6 was a combination of these two effluent mixtures 4 and 5;

Mixture 6=21.9% v/v Mixture 4
78.1% v/v Mixture 5

Mixture 7 was a simulated effluent mixture of developer, bleach, fix and final rinse.

Mixture 7=0.7% v/v Developer
2.3% v/v Bleach (at 5 mL/m rep rate)
34.9% v/v Fixer
62.1% v/v Rinse
0.002 mol/L AgI (0.47 g/L)
0.062 mol/L AgBr (11.66 g/L)

The AgI and AgBr are omitted if the test references effluent of Mixture 7 without silver.

Example 1

Effectiveness with Photographic Processing Solutions and Simulated Effluent Mixtures This is an adaptation of similar methods found in pertinent literature (see *Modern Superabsorbent Polymer Technology*, edited by F. L. Buchholz and A. T. Graham, WILEY-VCH, 1998.)

A weighed amount of a superabsorbent gel sample (2 grams) was placed in a beaker with a 100 mls of solution. For the tap water experiments 0.5 grams of gel and 100 mls of water was used. The compositions of the solutions used are listed separately. After the introduction of the solution the beaker was covered with Parafilm® to minimize evaporation and allowed to stand at room temperature (72 F.) for a specified amount of time. The contents of the beaker were then emptied in a fine sieve lined with fine mesh nylon strainer Intex® and drained under light pressure until minimum surface moisture was evident on the gel particles. The volume of free liquid passing through the strainer was collected in a graduated cylinder. Equilibrium absorption capacities are defined as the measurements obtained 24 hours after the introduction of the liquid. Table 1 summarizes the equilibrium absorption capacities obtained with the various photographic processing solutions described above.

TABLE 1

Comparison of equilibrium absorption capacity of commercially available gels with photographic processing solutions and simulated effluents.

|  | Polyacrylamide (Soilmoist) (mls/gr.) | Polyacrylate-Polyalcohol P-7588 (mls/gr.) | Chemgon ® (mls/gr.) |
|---|---|---|---|
| Tap Water | 140 | 166 | 130 |
| Developer | 20 | 27.5 | 21 |
| Bleach | 7.5 | 3 | 9 |
| Fix | 15 | 22.5 | 16 |
| Final Rinse | 58 | 76.5 | 56 |
| Mixture 1 | 16 | 22.5 | 17.5 |
| Mixture 2 without silver | 18 | 24.5 | 18 |
| Mixture 3 without silver | 17 | 23 | 18 |

For all absorbents, the equilibrium capacity changed with the pH of the solution and the ionic strength relative to that of tap water. The Final Rinse, a dilute and almost neutral pH solution, had the highest equilibrium absorption capacity of the tested solutions relative to water. The bleach, a low pH solution, severely compromised absorption in most cases. Chemgon® seemed to be relatively insensitive to pH changes, but its equilibrium absorption capacity was in most cases lower than that of Polyacrylate-Polyalcohol P-7588.

Example 2

Time Dependence of Effective Absorption

The experimental method used to obtain these data is listed in example 1. Table 2 shows a representative comparison of absorption rates of Mixture 3 without silver for various gels as a function of time.

TABLE 2

Time dependence of absorption of Mixture 3 without silver with non-biodegradable superabsorbents (Percentages in brackets are % of equilibrium absorption capacity)

| Time (min) | Polyacrylamide Soilmoist (mls/gr.) | Polyacrylate-Polyalcohol P-7588 (mls/gr.) | Chemgon ® (mls/gr.) |
|---|---|---|---|
| 5 | 2 (12%) | 16.5 (72%) | 11.5 (64%) |
| 10 | 3 (18%) | 17.5 (76%) | 14.5 (81%) |
| 30 | 5.5 (32%) | 22.5 (98%) | 17.5 (97%) |
| 120 | 12 (71%) | 23 (100%) | 18.5 (100%) |

Chemgon® and polyacrylate-polyalcohol reach over 75% of their equilibrium absorption capacity in the first 10 minutes. In contrast, polyacrylamide absorbs slowly, reaching only about 18% of its equilibrium absorption capacity in the first 10 minutes. This may be a function not only of the properties of the materials, but the particle size as well. The polyacrylamide sample had the highest particle size of all gel samples examined (approx. 3 mm granules). Rapid absorption is preferred for use with in-line waste absorption, especially when large quantities of photographic processing solutions may need to be disposed of at once.

Example 3

Paint Filter Test

This test is a simulation of the EPA 9095A test and was used to determine the amount of sorbent per ml of solution necessary for the waste to be characterized "apparently dry". A certified laboratory using 100 ml of test solution runs the EPA test. This test method used 120 mls of simulated photographic processing effluent solution (Mixture 3 without silver). The solution was poured atop a weighed amount of an absorbent material placed in a 200 ml beaker. The 3M absorbent pad was cut to approximately ½"×½" size for this test. Each beaker was covered tightly with Parafilm® to minimize evaporation. The composition of the solution used is listed separately. Each absorbent was allowed to stand for 24 hrs. at room temperature. The swollen absorbent in each beaker was then stirred and poured in a glass funnel lined with a Sherman Williams fine mesh paint filter (catalog number 153 6291). The funnel was mounted on a ring stand and any fluid passing through the conical paint filter was collected in a beaker positioned below the funnel. A sample was rated "unacceptable" if any fluid was observed passing through the filter within 5 minutes after the introduction of the swollen absorbent into the paint filter. If no fluid would pass through the filter in 5 minutes the sorbent was deemed "acceptable".

TABLE 3

Milliliters per gram of solution absorbed to render Apparently Dry

| Sorbent | Unacceptable | Unacceptable | Acceptable |
|---|---|---|---|
| Chemgon ® | 20 mls/gr | 16 mls/gr | 14.0 mls/gr |
| Polyacrylate-Polyalcohol (P-7588) | 23 mls/gr. | 18.4 mls/gr | 16.1 mls/gr |
| Polyacrylamide (Soilmoist) |  | 18 mls/gr | 14.4 mls/gr |
| 3M sorbent C-PD914DD |  | 20 mls/gr | 10 mls/gr |

Based on these data, Polyacrylate-Polyalcohol should be characterized "apparently dry" after absorbing approximately 16 mls of solution per gram of gel. Chemgon® and Soilmoist Polyacrylamide shall be acceptable after absorbing approximately 14 mls of solution per gram of gel. The 3M sorbent pad shall pass after absorbing approximately 10 mls per gram of sorbent. These numbers are lower than those measured as equilibrium absorption capacities, since the method used for the latter does not specifically exclude all surface moisture.

Example 4

Examples of Gelatin Based Absorbents

The following materials were used to make the gelatin based absorbents

| Gelatins: | | |
|---|---|---|
| Gelatin I.D. | Gelatin visc. | Gel strength gms |
| Gelatin A | 9.0 cp | 250 |
| Gelatin B | 3.0 cp | 100 |
| Gelatin C | 12.4 cp | 220 |

The gelatin viscosity is the viscosity of a 6.16 gelatin solution measured at 45 C. and is directly proportional to the mean molecular weight of the gelatin. The gel strength is synonymous with 'bloom strength' and is measured by chilling 6.16% gelatin solution to 10° C. for 24 hours and then measuring the weight in grams required to depress a cylindrical plunger 0.5" in diameter, with a 1/64th radius of curvature at the bottom, by 4 mm.

The crosslinker, X1, that was used for gelatin was bis(vinylsulfonyl)methane. Polyelectrolytes used were P1—sodium salt of polyacrylic acid (MW 450,000)

P2—Sodium salt of co poly(vinyltoluene sulfonate) (maleic anhydride)—weight ratio of the two monomers are 75/25 (MW 15,000)

P3—Sodium poly(acrylamido-2-methylpropanesulfonate) (MW500,000 to 1,000,000)

P4—sodium salt of poly(maleic acid) (MW 20,000)

Crosslinkable Polymers

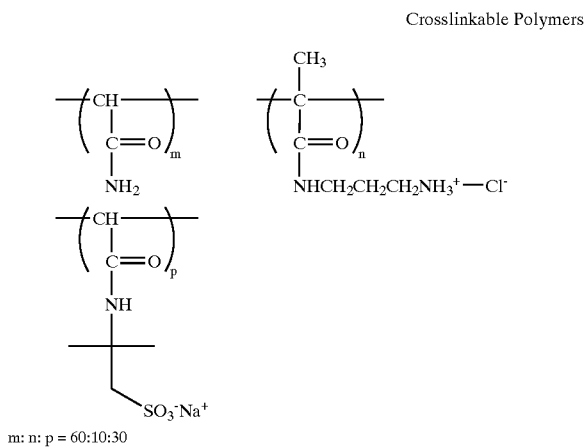

m: n: p = 60:10:30

Procedure:

Absorbent Preparation: 10% gelatin solutions were prepared with the respective gelatins. To these were added the respective polymer solutions which were also 10% in concentration. Finally, a 2% solution of the crosslinker was added. All the mixing operations were carried out at 45 C. After mixing, the solution is poured into a metal tray that is kept at <10 C., to form a gel. The gel slab is then put into a 'noodling' device to extrude noodles of 5 mm in width. The noodles are then dried overnight in an oven. The dried noodles were then crushed to a mesh size >12 (1.7 μm)<.

Three absorbing liquids were tested a) water, b) Mixture 1 spent developer and spent bleach and c) Mixture 2 of spent developer and spent bleach, 0.5 gm of the dried gelatin granules was contacted with 20 gms of the respective liquid and left to stand overnight. The excess liquid was drained through a nylon mesh and the difference in the weight of the wet and dry absorbent was noted. The absorption efficiency was calculated as the gms of liquid absorbed/gm of dry absorbent. The saturated gel was then incubated at different temperatures and the temperature of melting was noted. Since the desired properties of the absorbent is that it should have a high efficiency and a high thermal stability, a factor termed absorbent effectiveness was defined as the product of the absorbent efficiency and the melting temperature of the saturated gel.

The Table 4 gives the composition of the various absorbents that were prepared.

TABLE 4

Composition of Tested Biodegradable Absorbents

| | |
|---|---|
| A1 | Gelatin A + 5.69 μmole X1/gm gelatin |
| A2 | Gelatin A + 28.5 μmole X1/gm gelatin |
| A3 | Gelatin A + 57 μmole X1/gm gelatin |
| A4 | Gelatin C + 5.69 μmole X1/gm gelatin |
| A5 | Gelatin C + 28.5 μmole X1/gm gelatin |
| A6 | Gelatin C + 57 μmole X1/gm gelatin |
| A7 | Gelatin B + 5.69 μmole X1/gm gelatin |
| A8 | Gelatin B + 28.5 μmole X1/gm gelatin |
| A9 | gelatin B + 57 μmole X1/gm gelatin |
| A10 | gelatin B + 85.5 μmole X1/gm gelatin |
| A11 | gelatin A + (0.1 gm P3 + 28.5 μmole X1)/gm gelatin A |
| A12 | gelatin A + (0.2 gm P3 + 42.7 μmole X1)/gm gelatin A |
| A13 | gelatin A + (0.3 gm P3 + 42.7 μmole X1)/gm gelatin A |
| A14 | gelatin A + (0.2 gm P1 + 42.7 μmole X1)/gm gelatin A |
| A15 | gelatin A + (0.2 gm P4 + 42.7 μmole X1)/gm gelatin A |
| A16 | gelatin A + (0.2 gm P2 + 42.7 μmole X1)/gm gelatin A |
| A17 | gelatin A + (0.15 gm PX + 14.2 μmole X1)/gm gelatin A |
| A18 | gelatin A + (0.15 gm PX + 28.5 μmole X1)/gm gelatin A |
| A19 | gelatin A + (0.15 gm PX + 57 μmole X1)/gm gelatin A |

Example 5

Effect of Gelatin Characteristics and Cross Linker Level on Absorption

Absorbent materials A1–A10 are examples of materials made with different gelatin characteristics and with different levels of chemical cross linker. The effects of gelatin characteristics and cross linker level on gel absorption are given in Table 5.

TABLE 5

Effect of gelatin characteristics and cross linker level

| | Water | | | Mixture 1 | | | Mixture 2 | | |
|---|---|---|---|---|---|---|---|---|---|
| Absorbent | Abs. Efficiency | Melting temp | Effectiveness | Abs. Efficiency | Melting temp | Effectiveness | Abs. Efficiency | Melting temp | Effectiveness |
| A1 | 22.69 | 33 | 749 | 14.55 | 35 | 509 | 13.40 | 35 | 469 |
| A2 | 17.85 | 55 | 982 | 9.63 | 70 | 674 | 10.02 | 51.9 | 520 |
| A3 | 12.45 | 75 | 934 | 6.50 | 75 | 487 | 7.08 | 75 | 531 |
| A4 | 31.10 | 35 | 1089 | 20.28 | 32.5 | 659 | 18.96 | 32.5 | 616 |
| A5 | 21.08 | 47.5 | 1002 | 15.02 | 40 | 601 | 13.68 | 40 | 547 |
| A6 | 12.40 | 75 | 930 | 8.55 | 75 | 641 | 8.28 | 75 | 621 |
| A7 | Gelatin Dissolved | | | Gelatin Dissolved | | | Gelatin Dissolved | | |
| A8 | 22.47 | 29.6 | 665 | Gelatin Dissolved | | | Gelatin Dissolved | | |
| A9 | 20.27 | 35 | 709 | 21.20 | 29.6 | 627 | 17.29 | 33 | 571 |
| A10 | 11.55 | 75 | 866 | 7.83 | 70 | 548 | 9.42 | 55 | 518 |

Absorbents A1, A2 and A3 are made with the medium viscosity gelatin (Gelatin A) at increasing cross linker levels. It is seen that the effectiveness is maximum at the middle level of cross linker, for all three liquids.

Absorbents A7, A8, A9, A10 made with the lowest viscosity gelatin (Gelatin B) have comparable effectiveness compared to Gelatin A at the same cross linker level (A2 vs A8 and A3 vs A9), however, their melting temperature is lower. In order to achieve comparable effectiveness and melting temperature, the lower viscosity Gelatin B requires a higher level of cross linker than Gelatin A. In the case of A7 and A8, the lower viscosity Gelatin B dissolves in the absorbing solution, whereas A1 and A2 with the same level of cross linker but made with higher viscosity gelatin remains intact.

Absorbents A4, A5 and A6, made with Gelatin B which has the higher viscosity and lower gel strength than Gelatin A have higher effectiveness than absorbents made with Gelatin A at comparable cross linker levels (A6 vs A3). Thus, it is preferable to use higher viscosity gelatins for maximum effectiveness.

Example 6

Effect of Anionic Polyelectrolytes on Absorption

Table 6 summarizes the test results for the effect of anionic polyelectrolytes present in biodegradable gelatin based absorbents.

The absorbents A11–A16 were all made with Gelatin A. The maximum effectiveness of these absorbents, for each respective solution, is higher than the maximum effectiveness obtained without any polyelectrolyte (A1–A3) for the same absorbing solution. Thus, to obtain high effectiveness it is desirable to use some amount of anionic polyelectrolytes mixed in with the gelatin. Based on the data in Table 5 the effective level is from 10 to 30% polyelectrolyte with respect to the amount of gelatin. It is also seen that polyelectrolyte P1 used to prepare absorbent A14 is superior in performance compared to the other polyelectrolytes used.

The paint filter test, as described in Example 3, was run with absorbents A14 and A12, using Mixture 3. The results obtained are shown in the Table below

| Sorbent | Unacceptable | Acceptable |
|---|---|---|
| A14 | 14 mls/gr | 10 mls/gr |
| A12 | 8 mls/gr. | 4 mls/gr |

The gelatin-based absorbents, with the polyelectrolytes, pass the paint filter test, and the absorbed waste can be characterized as apparently dry

TABLE 6

Effect of anionic polyelectrolytes on absorption

| | Water | | | Mixture 1 | | | Mixture 2 | | |
|---|---|---|---|---|---|---|---|---|---|
| Absorbent | Abs. Efficiency | Melting temp | Effectiveness | Abs. Efficiency | Melting temp | Effectiveness | Abs. Efficiency | Melting temp | Effectiveness |
| A1 | 22.69 | 33 | 749 | 14.55 | 35 | 509 | 13.40 | 35 | 469 |
| A2 | 17.85 | 55 | 982 | 9.63 | 70 | 674 | 10.02 | 51.9 | 520 |
| A3 | 12.45 | 75 | 934 | 6.50 | 75 | 487 | 7.08 | 75.1 | 531 |
| A11 | 23.40 | 75 | 1755 | 11.42 | 52.5 | 599 | 12.25 | 42.5 | 521 |
| A12 | 20.06 | 75 | 1504 | 8.87 | 75 | 665 | 9.52 | 65 | 619 |
| A13 | 29.14 | 75 | 2186 | 20.64 | 57.5 | 1187 | 11.66 | 50 | 583 |
| A14 | 33.10 | 75 | 2482 | 10.69 | 70 | 748 | 14.97 | 47.5 | 711 |
| A15 | 11.43 | 75 | 857 | 8.23 | 75 | 617 | 8.03 | 75 | 602 |
| A16 | 16.18 | 75 | 1214 | 10.42 | 65 | 677 | 10.19 | 55 | 560 |

Example 7

The Effect of Cross-linkable Polyelectrolytes on Absorption

Table 7 summarizes the test results for the effect of crosslinkable polyelectrolytes on absorption.

TABLE 7

Effect of cross linkable polyelectrolyte (PX) on gelatin absorption.

| | Water | | | Mixture 1 | | | Mixture 2 | | |
|---|---|---|---|---|---|---|---|---|---|
| Absorbent | Abs. Efficiency | Melting temp | Effectiveness | Abs. Efficiency | Melting temp | Effectiveness | Abs. Efficiency | Melting temp | Effectiveness |
| A17 | 27.85 | 35 | 975 | 16.86 | 35 | 590 | 15.60 | 35 | 546 |
| A18 | 22.91 | 37.5 | 859 | 12.17 | 37.5 | 456 | 11.21 | 37.5 | 421 |
| A19 | 18.39 | 50 | 919 | 10.29 | 58.5 | 602 | 8.29 | 58.5 | 485 |

Absorbents A17–A19 are made with Gelatin A and cross-linkable polyelectrolyte PX. It is seen that the effectiveness of absorbents partially containing a cross-linkable polyelectrolyte is not substantially degraded compared to the absorbents made with gelatin alone (A1–A3). Thus, for cost reasons it might be beneficial to use the cross-linkable polyelectrolyte partially substituting the gelatin.

Example 8

Effectiveness of TMT to Reduce Silver Ion Levels Below 5 ppm

Bench testing was performed to evaluate the ability of TMT to precipitate silver from simulated photographic processing solution effluent. TMT was used in two forms, a solid form known as TMT-55 and a solution known as TMT-15. Typical doses of TMT are between 1.6 to 1.8 stoichiometric equivalents of TMT to silver, but higher does can be used if there is poor agitation. This experiment evaluated two dosage levels; examining the 1.8 and 3.6 stoichiometric equivalent. The testing method examined one-liter batches of the test solution, Mixture 7, after it was added to a beaker containing TMT. For the metered tests, the test solution was added by metering it slowly (12.8 mL/min) to the bottom of the vessel that was filled with the corresponding amount of TMT. With the poured tests, the test solution was poured directly atop of the TMT. Samples were extracted using a syringe at roughly ⅓ of the distance into the beaker of treated solution. Each sample was filtered immediately after removal with a syringe filter to remove any of the Ag-TMT precipitate that was formed. To obtain an understanding of the effect of mixing, the "mixed" sample was taken after 5 revolution is of the stirrer after the 48 hrs sample. No flocculant or any kind of mechanical mixing was used besides the stirring step after 48 hours. Time is defined as the number of hours after addition was complete. Results are presented in Table 8.

TABLE 8

ICP results for filtered samples (using TMT-55 solid) and Mixture 7 (used .20 µm filter)

| Sample Time (hrs) | 1.8S metered Ag (µg/mL) | 3.6S metered Ag (µg/mL) | 1.8S poured Ag (µg/mL) | 3.6S poured Ag (µg/mL) |
| --- | --- | --- | --- | --- |
| 0 | 6900 | 6900 | 6900 | 6900 |
| 1 | 5400 | 1800 | 1500 | 0.3 |
| 4 | 3900 | 1700 | 1400 | 0.3 |
| 8 | 2700 | 870 | 1300 | 0.3 |
| 24 | 660 | 27 | 1200 | 0.3 |
| 48 | 18 | 0.9 | 110 | 0.3 |
| mixed | 0.3 | 0.3 | 0.3 | 0.3 |

These data clearly show that TMT can be used to remove silver down to ppm levels and that the final level of soluble silver is related to the dosage of TMT and mixing (higher dosing and greater mixing lead to better silver recovery levels).

Using the soluble form of TMT, TMT-15, is more effective than the solid form as shown in Table 9.

TABLE 9

ICP results for filtered samples (using TMT-15) and Mixture 7 (used .20 µm filter)

| Sample Time (hours) | 1.8S metered Ag (µg/mL) | 3.6S metered Ag (µg/mL) | 1.8S poured Ag (µg/mL) | 3.6S poured Ag (µg/mL) |
| --- | --- | --- | --- | --- |
| 0 | 6900 | 6900 | 6900 | 6900 |
| 1 | 2900 | 0.4 | 0.3 | 0.3 |
| 4 | 2500 | 0.3 | 1.1 | 0.3 |
| 8 | 1900 | 0.3 | 0.8 | 0.3 |
| 24 | 350 | 0.3 | 0.8 | 0.3 |
| 48 | 1.1 | 0.9 | 0.3 | 0.3 |
| mixed | 0.6 | 0.3 | 0.3 | 0.3 |

Both forms of TMT, solid or liquid, are significantly more effective than Chemgon® in reducing leachable silver ion to (µg/ml (ppm) levels.

The invention has been described in detail with particular reference to certain preferred embodiments thereof, but it will be understood that variations and modifications can be effected within the spirit and scope of the invention.

What is claimed is:

1. A method of disposing of photographic silver halide processing solutions including developer solution, bleach solution and at least one silver bearing solution comprising a) combining only the developer and bleach solutions to oxidize the developing agent in the developer and form a developer/bleach waste solution, b) treating the silver bearing solution(s) to reduce the silver ion level and form a low silver waste solution; and c) contacting the developer/bleach waste solution and the low silver waste solution with an absorbent material to form an apparently dry waste material having a leachable silver ion level below 5 ppm.

2. The method of claim 1 wherein there is more than one silver bearing solution and the silver bearing solutions are combined before being treated to reduce silver ion level.

3. The method of claim 1 wherein the developer/bleach waste solution is contacted with a first absorbent material and the low silver waste solution is contacted with a second absorbent material resulting in two separate apparently dry waste materials.

4. The method of claim 1 wherein the developer/bleach waste solution and the low silver waste solution are contacted with the same absorbent material resulting in one apparently dry waste material.

5. The method of claim 1 wherein the silver bearing solutions are treated to reduce silver ion content by contacting the solutions with a precipitating agent which will precipitate silver salts.

6. The method of claim 5 wherein the precipitating agent is a mercapto-s-triazine compound represented by Formula I

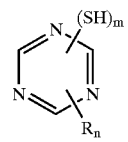

Formula I wherein:

R is hydrogen, —NH$_4$, —OH, alkyl having 1 to 8 carbon atoms, alkoxy having 1–8 carbon atoms, phenyl, cyclohexyl, oxazinyl, phenoxy, —NR'$_2$ or —SR";

R' is hydrogen, alkyl having 1 to 8 carbon atoms, phenyl, cyclohexyl, naphthyl or benzyl;

and wherein:

R" is alkyl having 1 to 8 carbon atoms, phenyl, cyclohexyl, naphthyl or benzyl; m is an integer from 1 to 3; and n is 0, 1 or 2.

7. The method of claim 6 wherein the precipitating agent is trimercapto-s-triazine.

8. The method of claim 1 wherein the silver bearing solutions are treated to reduce silver ion content by converting the silver ion into silver metal.

9. The method of claim 8 wherein the method used to convert the silver ion into silver metal is electrolytic reduction or the use of a galvanic cell.

10. The method of claim 1 wherein the silver bearing solutions are treated to reduce silver ion content by a combination of contacting the solutions with a precipitating agent which will precipitate silver salts and converting the silver ion into silver metal.

11. The method of claim 1 wherein the absorbent material absorbs at least 20 mls/gm of distilled water using the Paint Filter test.

12. The method of claim 11 wherein the absorbent material further comprises a polypropylene or polyester material.

13. The method of claim 1 wherein the absorbent material absorbs at least 100 mls/gm of distilled water using the Paint Filter test.

14. The method of claim 1 wherein the absorbent material comprises a polysaccharide gel or protein gel.

15. The method of claim 14 wherein the absorbent material comprises gelatin.

16. The method of claim 15 wherein the gelatin is chemically crosslinked and wherein the amount of effective moles of crosslinker utilized is about 2 to 200 $\mu$moles/gm of gelatin.

17. The method of claim 16 wherein the absorbent further comprises an anionic polyelectrolyte.

18. The method of claim 17 wherein at least 25% of the monomers comprising the polyelectrolyte contain a carboxylic acid group.

19. The method of claim 17 wherein the anionic polyelectrolyte is a polyacrylic acid.

20. The method of claim 17 wherein the anionic polyelectrolyte is sodium poly(acrylamido-2-methyl propane sulfonate).

21. The method of claim 17 wherein the anionic polyelectrolyte is present in the amount of 10 to 30% of the absorbent.

22. The method of claim 17 wherein the anionic polyelectrolyte comprises at least 10 mole % of a cationic monomer which has a crosslinkable functionality.

23. The method of claim 15 wherein the gelatin has a nominal viscosity of greater than 10 cp.

24. The method of claim 15 wherein the absorbent material further comprises a polypropylene or polyester material.

25. The method of claim 1 wherein the treated silver bearing solution is separated into low silver waste solution and insoluble silver prior to the solution coming into contact with the absorbent.

26. A method of disposing of photographic silver halide processing solutions including developer solution, bleach solution and at least one silver bearing solution comprising a) combining the developer and bleach solutions to oxidize the developing agent in the developer and form a developer/bleach waste solution, b) treating the silver bearing solution(s) by contacting the solutions with a precipitating agent which will precipitate silver salts to reduce the silver ion level and form a low silver waste solution; and c) contacting the developer/bleach waste solution and the low silver waste solution with an absorbent material comprising gelatin to form an apparently dry waste material having a leachable silver ion level below 5 ppm.

27. The method of claim 26 wherein the precipitating agent is a mercapto-s-triazine compound represented by Formula I

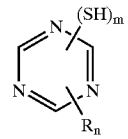

Formula I wherein:

R is hydrogen, —NH$_4$, —OH, alkyl having 1 to 8 carbon atoms, alkoxy having 1–8 carbon atoms, phenyl, cyclohexyl, oxazinyl, phenoxy, —NR'$_2$ or —SR";

R' hydrogen, alkyl having 1 to 8 carbon atoms, phenyl, cyclohexyl, naphthyl or benzyl;

and wherein:

R" is alkyl having 1 to 8 carbon atoms, phenyl, cyclohexyl, naphthyl or benzyl; m is an integer from 1 to 3; and n is 0 or 2.

28. The method of claim 26 wherein the gelatin is chemically crosslinked and wherein the amount of effective moles of crosslinker utilized is about 2 to 200 $\mu$moles/gm of gelatin.

* * * * *